US006606601B1

(12) United States Patent
Willard

(10) Patent No.: US 6,606,601 B1
(45) Date of Patent: Aug. 12, 2003

(54) DISTANCE DELIVERY OF VOCATIONAL SERVICES COUPLED WITH SHARED PAYMENTS FROM THIRD PARTY PAYERS

(76) Inventor: Mary Joan Willard, 366 Edgewood Ave., Mill Valley, CA (US) 94941

( * ) Notice: Subject to any disclaimer, the term of this patent is extended or adjusted under 35 U.S.C. 154(b) by 0 days.

(21) Appl. No.: 09/419,740

(22) Filed: Oct. 16, 1999

(51) Int. Cl.[7] .............................................. G06F 17/60
(52) U.S. Cl. ........................................ 705/1; 709/217
(58) Field of Search ....................................... 705/1, 26

(56) References Cited

U.S. PATENT DOCUMENTS

| 5,649,118 A | * | 7/1997 | Carlisle et al. ............. 395/241 |
| 6,055,511 A | * | 4/2000 | Luebbering et al. .......... 705/14 |
| 6,119,106 A | * | 9/2000 | Mersky et al. ................ 705/40 |
| 2001/0044833 A1 | * | 11/2001 | Eisendrath et al. ......... 709/217 |

FOREIGN PATENT DOCUMENTS

WO    WO 00/58861    * 10/2000    ............ G06F/17/00

OTHER PUBLICATIONS

Socal Ed Announces '95 Salary Freeze for Management; Sets Incentive Plan, Dec. 26, 1994, McGraw–Hill, Inc.*

* cited by examiner

Primary Examiner—James P. Trammell
Assistant Examiner—Jalatee Worjloh

(57) ABSTRACT

Vocational/employment services and supports delivered via distance methods such as an Internet-based information and support system, offer greater efficiency, convenience and depth and breadth of information than vocational services provided by conventional face-to-face delivery methods. In addition, such distance delivered services can be provided at a much lower cost than services provided via face-to-face meetings. The resulting cost savings make it possible for the provider of services to share with the consumer of services a substantial percentage of the payment that the provider receives from a third party payer. When payment from the third party payer is contingent upon the consumer achieving predetermined employment related goals, then a shared third party payment arrangement gives the consumer added incentive to achieve those goals and added reason to choose the provider using this method over others.

17 Claims, 1 Drawing Sheet

DISTANCE DELIVERY OF VOCATIONAL SERVICES COUPLED WITH SHARED PAYMENTS FROM THIRD PARTY PAYERS

TECHNICAL FIELD

The present invention relates to the provision of vocational and/or employment services and, particularly, to a method for distance delivery of such services coupled with shared payments from third-party payers.

BACKGROUND

The provision of vocational and/or employment services and support to unemployed or underemployed individuals have conventionally been provided via face-to-face meetings. Vocational or employment professionals provide services such as advice on how to select a vocational goal, research a career option, prepare a resume or conduct a job search. They also offer psychosocial support in an attempt to motivate the recipient of the services and facilitate the achievement of the employment-related objectives.

Conventional "near-proximity" methods of delivering vocational and/or employment services have major disadvantages associated with them. For example, vocational services offered via face-to-face meetings are labor intensive and require use of some type of physical facility, both of which contribute to the expense of such "near-proximity" methods. Furthermore, it is usually inconvenient for the consumer of such services to travel to a central location for face-to-face meetings, particularly if the consumer is economically disadvantaged or disabled with limited transportation options. The times at which the vocational services are offered are many times inconvenient for the consumer, particularly if they are dependent upon others to transport them, or if they need to work around the schedules of dependent children or their own personal care attendants.

Furthermore, the knowledge base of vocational service professionals is many times not specialized to match the specific needs of particular consumers. For example, a newly graduated computer science major who is quadriplegic, a mother of three on welfare and at a fifth grade reading level, and a former nurse with cognitive impairment due to brain injury, may all be assigned to the same vocational counselor at a one-stop state-funded employment center.

Psychosocial support from peers experiencing many of the same employment related challenges can be particularly meaningful to some consumers, but is usually lacking in the one-on-one face-to-face sessions scheduled by traditional vocational service providers. Arranging such connections is many times logistically impractical for conventional providers.

National Telecommuting Institute (NTI) is a non-profit disability organization that specializes in training individuals with disabilities who need home based work. This job training is delivered "long distance"—via the Internet, mail and telephone. Payment(s) to NTI are typically made by state vocational rehabilitation agencies, contingent upon the consumer of NTI's services becoming employed for a minimum of 90 days. Among knowledgeable people in the field, NTI's methods are considered cutting edge.

What is desired is a method of providing long-distance vocational and/or employment services that facilitates providing benefits to the consumers beyond just training.

SUMMARY

Vocational/employment services and supports delivered via distance methods such as a web-based information and support system, offer greater efficiency, convenience and depth and breadth of information than vocational services provided by conventional face-to-face delivery methods. In addition, such distance delivered services can be provided at a much lower cost than services provided via face-to-face meetings. The resulting cost savings make it possible for the provider of services to share with the consumer of services a substantial percentage of the payment(s) that the provider receives from a third party payer. When payment(s) from the third party payer are contingent upon the consumer achieving predetermined employment related goals, then a shared third party payment(s) arrangement gives the consumer added incentives to achieve those goals and added reason to chose the provider using this method over others.

DETAILED DESCRIPTION

Figure 1:
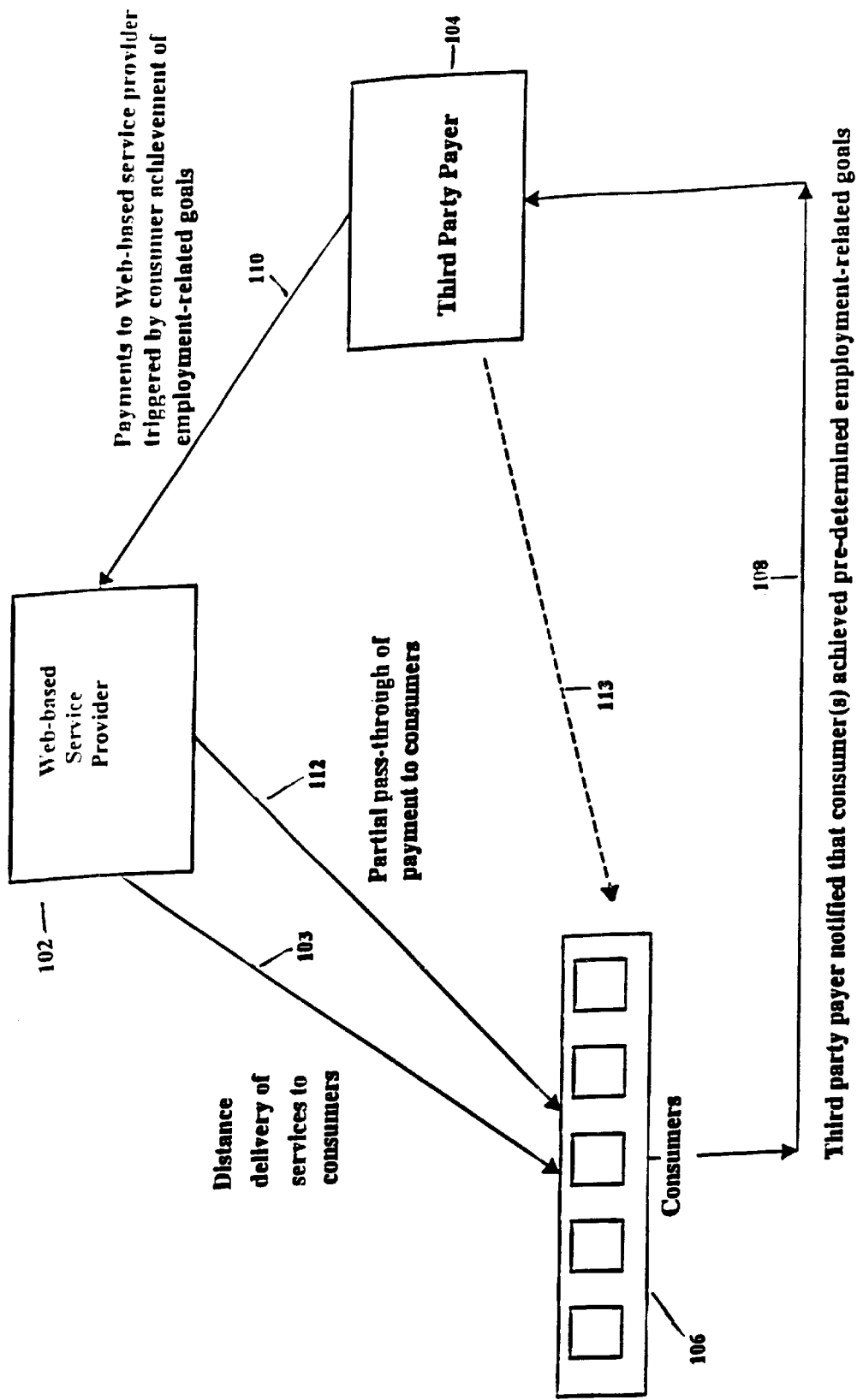
FIG. 1 illustrates the interaction of the four critical elements of this combination method.

A particular disadvantage of conventional vocational and/or employment services, even NTI's service, is that money that is critically needed by the services' clients is diverted to the service providers. That is, when payment is made by a third party for the provision of vocational/employment services, one hundred percent of the payment is kept by the provider. All of the payment is kept by the provider even when the payment itself is contingent upon the consumer's achievement. Thus, the consumer, whose behavior is the trigger for the payment, is deprived of what can be a source not only of monetary incentive for achieving his or her employment goals, but also money that could contribute to sustenance, support, and the long term maintenance of the employment-related goals.

In accordance with the invention, payments made by government agencies or other entities upon the consumer being employed for a certain period of time (or upon satisfying other predetermined criteria) are shared between the service provider and the consumer. "Payment" may be in one payment or multiple payments.

Vocational/employment services and supports delivered via distance methods, such as via the Internet, offer greater efficiency (in addition to offering convenience and depth and breadth of information) than vocational services provided by conventional face-to-face delivery methods. Significantly, such distance-delivered services can reach much larger numbers of consumers and can be provided at a much lower cost per consumer than services provided via face-to-face meetings. The resulting cost savings make it possible for the provider of services to share with the consumer of services a substantial percentage of the payment(s) that the provider receives from a third party payer.

When payment(s) from the third party payer are contingent upon the consumer achieving predetermined employment related goals, then a shared third party payment arrangement gives the consumer added incentives to achieve those goals and added reason to choose a particular provider who shares payments over other providers who do not. The more likely consumers are to achieve their employment-related goals, the more efficient the method is judged, from the perspectives of both the consumer and the third party payer.

In one embodiment, an Internet-based vocational service provider provides a facility for the formation of a virtual community of job seekers, presenting and linking users to information resources such as:

Self-tests, which enable users to assess their vocational interests, values and skills and discover which occupations, are most likely to match their particular profile.

Essential information about 7,000 occupations, updated regularly based on information obtained from the Department of Labor.

Information on how to identify sources of training for occupations which consumers have decided they wish to pursue.

Information on how to identify sources of funding for desired training.

Information on job seeking strategies customized to different fields.

Resume writing assistance.

Vocational rehabilitation services for individuals with disabilities such as adaptive equipment information for a variety of disabling conditions.

Work incentive planning for unemployed individuals contemplating a transition from government assistance to earned income.

Significantly, an Internet-based (or using other "long distance" methods) vocational service provider can achieve dramatic savings in labor and facility costs relative to a traditional provider who relies on face-to face meetings. A compensation arrangement that promises the consumer who achieves predetermined employment related goals a significant portion of the payment(s) that are made to the provider, results in added incentives for the consumer to achieve those goals and gives the consumer another source of funds which can be used for sustenance or for furthering their employment related goals.

Referring to FIG. 1, in a particular embodiment 100, a distance provider 102 of vocational and/or employment services enters into an agreement with a third-party payer 104 as to what employment related goals must be met by the consumer of the services in order for the third party payer to make payment(s) to the provider. Furthermore, the distance provider of the services 102 and a consumer of services 106 (shown in FIG. 1 as a plurality of consumers) enter into an agreement as to the formula by which any payment(s) received by the provider 102 from the third party payer 104 are to be shared with the consumer 106. The distance provider 102 delivers services 103, and if/when the consumer 106 achieves the predetermined employment related goals, the consumer 106 or provider 102 informs 108 the third party payer of that achievement. Once informed of the achievement of the predetermined goals on the part of the consumer 106, the third party payer 104 confirms that the goals were achieved and then initiates payment 110 to the provider 102 for that consumer 106.

When the distance provider 102 of services receives payment 110 from the third party payer 104, the distance provider 102 passes along a substantial percentage of the payment 112 to the consumer 106 whose achievement resulted in the triggering of the payment 110. This substantial percentage could be, for example, anywhere from 5–99% of the payment. While this substantial percentage is typically in the form of money, if mutually agreed upon by consumer 106 and provider 104, it can be in the form of goods or services. Alternately, the "pass-through" to be provided directly 113 from the third party payer 104 to the consumer 106.

In a preferred embodiment, the method is used to provide vocational and/or employment services and support to a large number of consumers with disabilities (e.g., in excess of 1,000). When payment(s) contingent upon the consumer achieving said goals are made by a single large government agency, such as a federal agency, operations are streamlined (by aggregating communications to the large agency) to achieve added savings. When savings made possible via distance delivery are added to the total, the provider has the ability to pass along to the consumer a substantial percentage of the third party payment(s). Payment(s) made to consumers can be an important source of funds for individuals with disabilities striving to maintain employment while confronted with expenses such as special transportation, adaptive equipment etc.

The ability of an Internet-based provider to pass along savings to consumers makes it very attractive to prospective consumers. The larger the number of consumers who agree to work with the Internet-based provider, the more efficient the method becomes in producing benefits for the consumers, the provider and the third party payer.

Additional embodiments include using this distance delivery and shared payments method in the delivery of services to welfare recipients, or individuals with disabilities receiving workers compensation benefits or private insurance payments.

Relative to conventional approaches, this unique method offers greater convenience, depth and breadth of vocational/employment information, and increased opportunities for the formation of supportive relationships among consumers.

The promise of receiving a significant percentage of third party payment(s) is likely to attract consumers to this method. The larger the number of consumers who select this method, the greater the resulting economies of scale. The greater the economies of scale, the greater the cost savings and the more the provider of services can make available to consumers as an incentive for them to achieve their employment related goals.

What is claimed is:

1. A method for delivering vocational and/or employment services, comprising:
   providing the services by a service provider to a consumer via distance delivery;
   providing payment from a third party payer to the service provider contingent upon the consumer achieving predetermined employment-related goals, and
   sharing the payment from the third party payer given to the service provider to the consumer which is a substantial percentage of the payment received by the service provider from the third party payer,
   whereby consumers can receive said services at a time and place convenient to them and receive a portion of the payment made to the provider that is contingent upon their achievements; wherein the third party payer is not the service provider.

2. The method of claim 1, wherein said distance delivery includes providing the services via the Internet.

3. The method of claim 1, wherein said distance delivery includes providing the services via a combination of the Internet and mail.

4. The method of claim 1, wherein said distance delivery includes a combination of the Internet, the mail and voice telephone.

5. The method of claim 1, wherein the substantial percentage of payment is between 25% and 99% of the payment.

6. The method of claim 1, wherein the substantial percentage of payment is between 50% and 99% of the payment.

7. The method of claim 1, wherein the substantial percentage of payment(s) received from the third party payer comprise anywhere from 65–99% of said payment.

8. The method of claim 1, wherein the universe of consumers includes individuals with disabilities.

9. The method of claim 1, wherein the universe of consumers includes individuals receiving welfare.

10. The method claim 1, wherein the universe of consumers includes individuals receiving benefits contingent upon the consumer being unemployed.

11. The method of claim 1, wherein the third party payer is a federal government agency.

12. The method of claim 1, wherein the third party payer is a state agency.

13. The method of claim 1, wherein the employment related goal(s) achieved by the consumer include at least one of paid employment and termination of benefits paid by the third party payer that were contingent upon the consumer being unemployed.

14. The method of claim 1, wherein the employment related goal achieved by the consumer include predetermined milestones directed toward the goal of permanent employment.

15. The method of claim 1, wherein the payment provided from the third party payer to the consumer does not include the substantial percentage and the substantial percentage is transmitted from the third party payer to the service provider.

16. The method of claim 1, wherein the payment provided from the third party payer to the service provider includes the substantial percentage and the substantial percentage is transmitted from the service provider to the consumer.

17. The method of claim 1, wherein the payment provided from the third party payer to the service provider includes the substantial percentage and the substantial percentage is transmitted from the service provider to the consumer.

* * * * *